(12) United States Patent
Laserson et al.

(10) Patent No.: US 11,275,769 B2
(45) Date of Patent: Mar. 15, 2022

(54) DATA-DRIVEN CLASSIFIER

(71) Applicant: NCR Corporation, Atlanta, GA (US)

(72) Inventors: Itamar David Laserson, Givat Shmuel (IL); Avishay Farbstein, Bruchin (IL)

(73) Assignee: NCR Corporation, Atlanta, GA (US)

( * ) Notice: Subject to any disclaimer, the term of this patent is extended or adjusted under 35 U.S.C. 154(b) by 210 days.

(21) Appl. No.: 16/368,188

(22) Filed: Mar. 28, 2019

(65) Prior Publication Data

US 2020/0311105 A1   Oct. 1, 2020

(51) Int. Cl.
*G06F 16/28* (2019.01)
*G06F 17/16* (2006.01)
*G06K 9/62* (2022.01)
*G06F 16/242* (2019.01)

(52) U.S. Cl.
CPC .......... *G06F 16/285* (2019.01); *G06F 16/243* (2019.01); *G06F 17/16* (2013.01); *G06K 9/628* (2013.01)

(58) Field of Classification Search
None
See application file for complete search history.

(56) References Cited

U.S. PATENT DOCUMENTS

| | | | | |
|---|---|---|---|---|
| 6,035,284 | A * | 3/2000 | Straub | G06F 16/285 |
| 2005/0050077 | A1 * | 3/2005 | Li | G06F 16/2465 |
| 2009/0172035 | A1 * | 7/2009 | Lessing | G06F 16/284 |
| 2010/0223261 | A1 * | 9/2010 | Sarkar | G06F 16/38 |
| | | | | 707/726 |
| 2015/0095185 | A1 * | 4/2015 | Katukuri | G06F 16/248 |
| | | | | 707/722 |
| 2017/0278173 | A1 * | 9/2017 | Ettl | G06F 16/31 |
| 2018/0068371 | A1 * | 3/2018 | Krishnamurthy | G06F 16/31 |
| 2018/0150525 | A1 * | 5/2018 | Daniel | G06F 16/24575 |
| 2018/0267976 | A1 * | 9/2018 | Bordawekar | G06F 16/3347 |
| 2019/0121867 | A1 * | 4/2019 | Misra | G06F 16/285 |
| 2020/0159773 | A1 * | 5/2020 | Chao | G06F 16/90332 |
| 2021/0166179 | A1 * | 6/2021 | Pande | G06F 16/9535 |

* cited by examiner

*Primary Examiner* — Son T Hoang
(74) *Attorney, Agent, or Firm* — Schwegman, Lundberg & Woessner

(57) ABSTRACT

One method embodiment includes receiving a transaction dataset including data representative of transactions including data representative of at least one product purchased within the respective transactions. This method then processes the dataset according to a contextualizing algorithm to generate a data representation for at least some products included in transactions of the transaction dataset. Each generated data representation represents a context of a product with regard to each of the other products of the data representation. This method further includes processing the generated data representations according to a clustering algorithm to partition products represented by the generated data representations into a number of product clusters. A data representation of the product clusters may then be stored including data identifying products and the product clusters to which they are partitioned.

12 Claims, 3 Drawing Sheets

DATA-DRIVEN CLASSIFIER

BACKGROUND INFORMATION

Product classification is essential to many aspects of sales industries, such as retail. Product categorization is typically performed manually and a priory by catalog experts based on product character and purpose. Poor product classification leads to poor decision-making across all retail segments resulting in considerable lost revenue.

SUMMARY

Various embodiments herein each include at least one of systems, methods, and software implementing a data-driven classifier. One method embodiment includes receiving a transaction dataset including data representative of a plurality of transactions, data of each transaction including data representative of at least one product purchased within the respective transaction. This method then processes the transaction dataset according to a data contextualizing algorithm. The data contextualizing algorithm, in some embodiments, generates a data representation for each of at least some unique products included in transactions represented in the transaction dataset. Each of these generated data representations represents a context of a product with regard to each of the other products included in the data representation. This method further includes processing the generated data representations according to a clustering algorithm to partition products represented by the generated data representations into a number of product clusters. A data representation of the product clusters may then be stored including data identifying products and the product clusters to which they are partitioned.

Another method embodiment includes processing a transaction dataset according to a data contextualizing algorithm to generate a data representation of contexts for each of at least some unique products included in transactions represented in the transaction dataset. The method of this embodiment further includes processing the generated data representations according to a clustering algorithm to partition products represented by the generated data representations into a number of product clusters. Subsequently, a data representation of the product clusters is stored that includes data identifying products and the product clusters to which they are partitioned.

A further embodiment is in the form of a system that includes a processor and a memory device storing instructions that are executable by the processor to perform data processing activities. The data processing activities include processing a transaction dataset according to a data contextualizing algorithm to generate a data representation of contexts for each of at least some unique products included in transactions represented in the transaction dataset. The data processing activities further include processing the generated data representations according to a clustering algorithm to partition products represented by the generated data representations into a number of product clusters. The data processing activities also include storing, on the at least one memory device, a data representation of the product clusters including data identifying products and the product clusters to which they are partitioned.

DETAILED DESCRIPTION

As mentioned above, product classification is essential to many aspects of sales industries, such as retail. Product categorization is typically performed manually and a priory by catalog experts based on product character and purpose. Poor product classification leads to poor decision-making across all retail segments resulting in considerable lost revenue. The various embodiments herein provide solutions that outperform the classic a priory product categorization by leveraging production data, such as transaction data, to discover and leverage information and knowledge from purchasers, products, and relations therebetween that exist both consciously and subconsciously for purchasers. Some such embodiments include apply a contextualizing algorithm to transaction data, such as the "Word2Vec" algorithm to study the affinity between products and provide more accurate data-driven product classification. The output of the contextualizing algorithm may then be processed by a clustering algorithm, such as a K-means algorithm, to identify contextual product relations, such as interchangeable and complimentary products. An example of an interchangeable product may be brand A of penne pasta being interchangeable with brand B of penne pasta. A complimentary product may be a tomato sauce with either brand of penne pasta. The various embodiments herein execute to identify such product classifications, data representations of which are output and stored for various uses. Such uses may include influencing product placements in stores and in online marketplaces, to identify product suggestions and substitutions, assist or influence product ordering, and other such and even different purposes.

Figure 1:
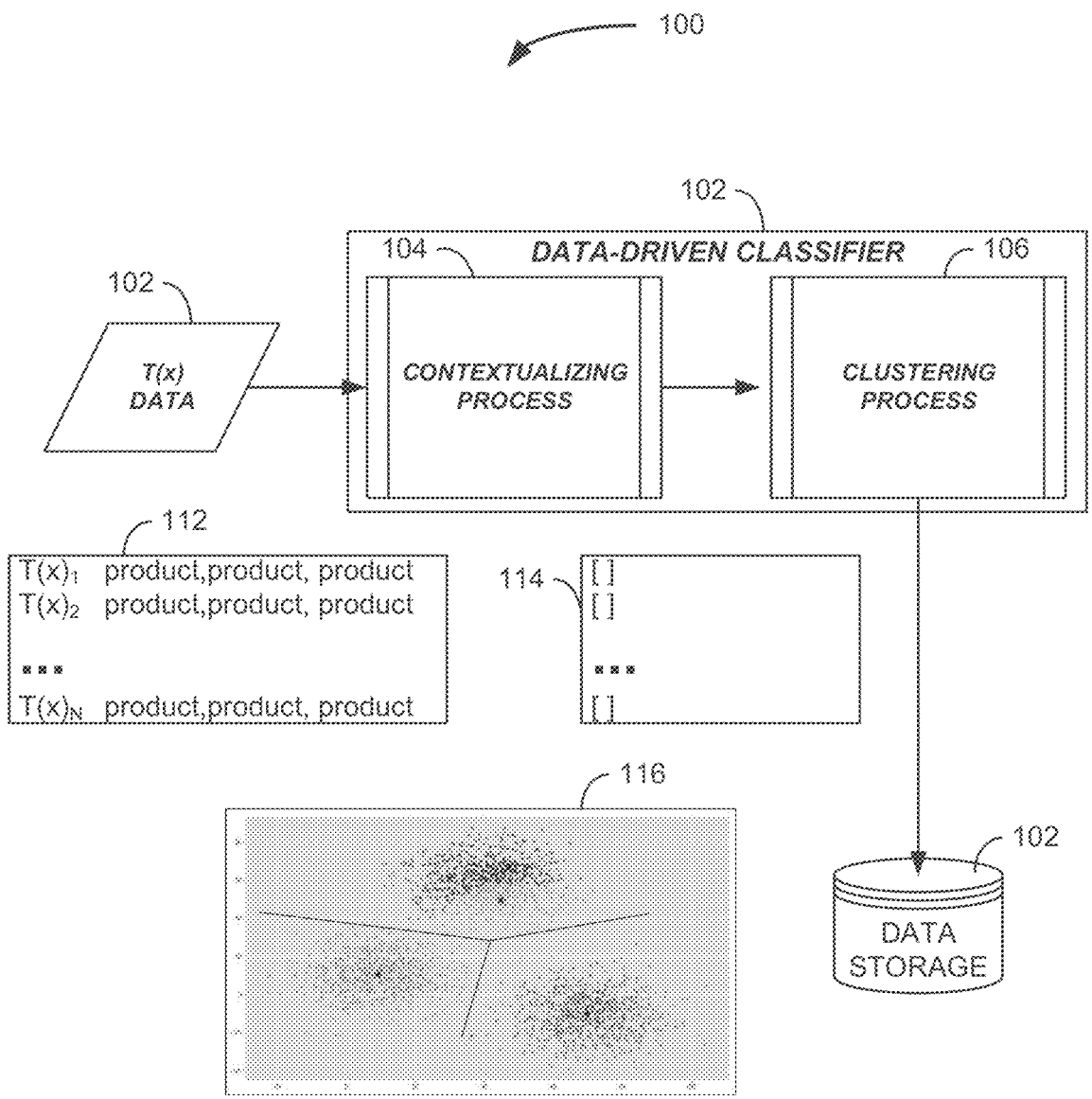
FIG. 1 is a flow diagram of a method, according to an example embodiment.

For example, some embodiments provide a central data-driven catalog clustering tool that performs a clustering method 100, as illustrated in FIG. 1, that relies on transaction data 102 of an implementing entity, such as transaction data that may be accessed via a retailer's transaction data module (TDM). Such embodiments generally avoid reliance on catalog expert presumptions. The goal in processing the transaction data 102 is to group similar products in the same cluster. The clustering tool will learn the relation between the products in the catalog based on all the transactions (e.g., $Tx_1, Tx_2, \ldots Tx_N$, completed over a period, typically a long, extended period. However, the period may be adjusted to account for a period within which the clustering data is to be utilized, such as starting with transaction data of one or more equivalent periods from a year or more prior to account for seasonal influences. Regardless, the assumption is that if products A and B tend to appear in similar baskets then they are considered "similar items". For example, "Barilla Penne Pasta" and "DeCeco Penne Pasta" will often appear in the same basket with items such as: tomato sauce, olive oil, Parmesan cheese etc. Thus, they are similar products.

Provided with a vast number of transactions 112 included in the transaction data 102, there will be enough data to modulate and characterize a typical context of each item in a catalog. The transaction data 102 may come from a single entity, but it may also or alternatively come from other entities with similar items in their catalogs. Items with similar context will be identified as similar items through processing of the transaction data.

The processing of the transaction data 102 may vary between embodiments, but there are two common elements. These two elements are a contextualizing process 104 and a clustering process 106. In some embodiments, the contextualizing process 104 is based on the "Word2vec" algorithm, which discussed below, is itself a group of algorithms. The clustering process 106, in some of these and other embodiments, is based on the K-means algorithm.

Word2vec is a group of algorithms used primarily in the field of natural language processing (NLP) for machine translation. Word2vec takes as its input a large corpus of text and produces a vector space 114, typically of several hundred dimensions, with each unique word in the corpus being assigned a corresponding vector in the vector space 114. Word vectors are positioned in the vector space 114 such that words that share common contexts in the corpus are located in close proximity to one another in the vector space 114.

Such embodiments herein adapt the Word2vec algorithm to treat products, or items, as words and transactions as groups of words, or sentences, for application to a product catalog and transaction data. Eventually, each item in the catalog will be mapped to a vector with N dimensions (N is configurable). The vector represents the context of the item within the vector space 114. The smaller the distance between a pair of vectors (representing a pair of items) the more similar those items are.

With each item represented by a numeric vector of the vector space 114, clustering may then be performed. Application of a clustering algorithm 106, such as the K-means clustering algorithm, clusters the vectors, and thereby the individual item represented thereby, where each cluster 116 contains items that are similar to one another. The number of clusters (K) can be an input in some embodiments including the K-means or other clustering algorithm.

Such clustering embodiments may provide additional flexibility. A small K, i.e., number of clusters, may provide a good solution to product division to a small number of departments containing many items, for example dairy/vegetable/soft drinks departments etc. As the number K grows the clustering algorithm will output more clusters but also smaller and more accurate, or at least more concise, ones, e.g., rigatoni pastas/penne pasta clusters.

These and other embodiments are described further below with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 2:
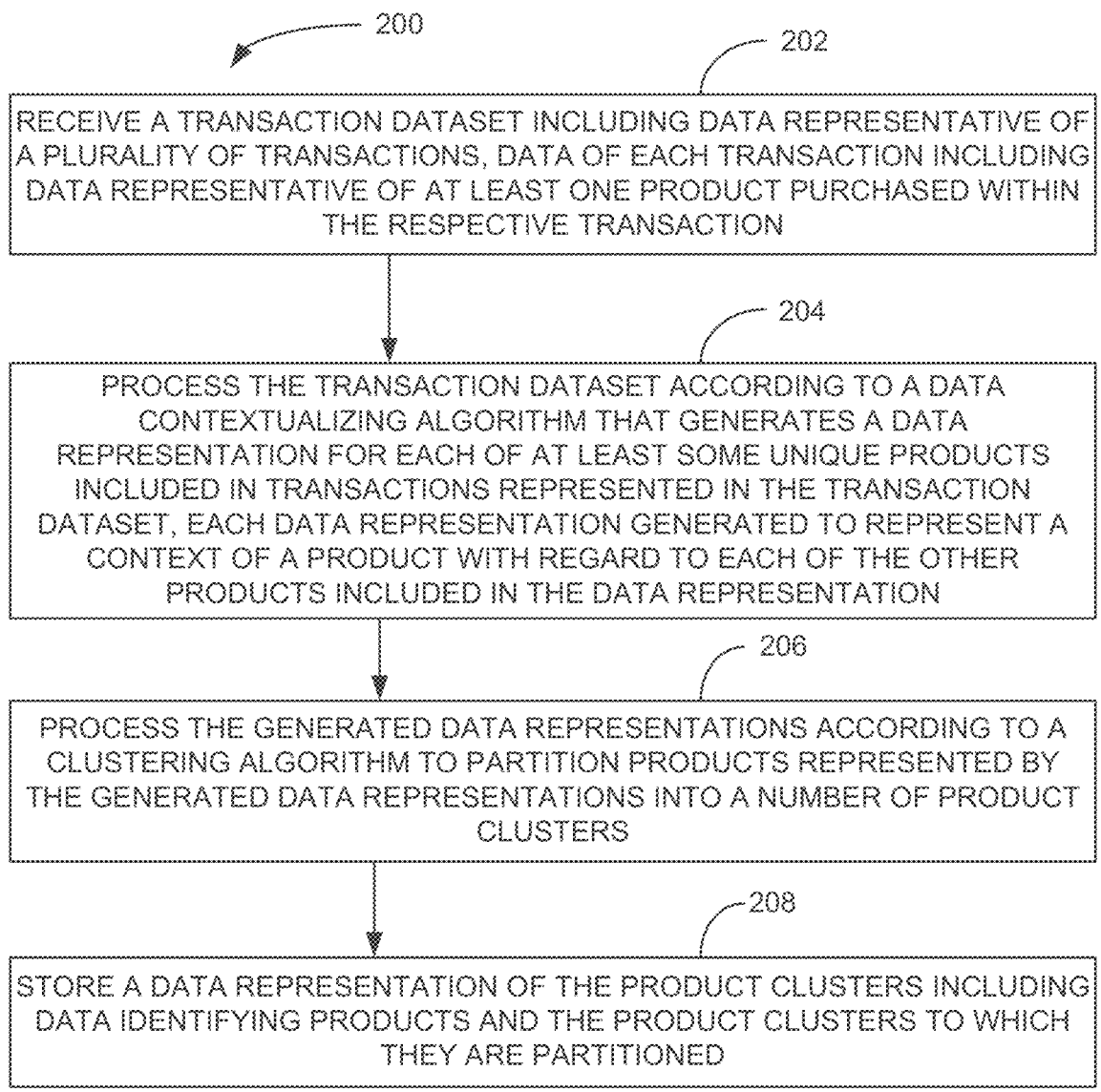
FIG. 2 is a block flow diagram of a method, according to an example embodiment.

FIG. 2 is a block flow diagram of a method 200, according to an example embodiment. The method 200 is an example of a data-driven classifier method that may be performed by a module of a computing device, e.g., as illustrated and described with regard to FIG. 3, or otherwise.

The method 200 includes receiving 202 a transaction dataset including data representative of a plurality of transactions. The data of each transaction typically includes data representative of at least one product purchased within the respective transaction. A product, which may also be referred to herein as an item, may be a physical or non-physical product, a service, or a combination thereof.

The method 200 further includes processing 204 the transaction dataset according to a data contextualizing algorithm that generates a data representation for each of at least some unique products included in transactions represented in the transaction dataset. Each data representation may be generated by the processing 204 to represent a context of a product with regard to each of the other products included in the data representation.

The method 200 may then proceed with further processing 206 of the generated data representations according to a clustering algorithm. The clustering algorithm partitions products represented by the generated data representations into a number of product clusters. Subsequently, the method 200 stores 208, or otherwise outputs, a data representation of the product clusters including data identifying products and the product clusters to which they are partitioned.

In some embodiments of the method 200, the data contextualizing algorithm is performed by a context module that executes on a computing device that receives the transaction dataset electronically. The contextualizing algorithm executed by the context module, in some embodiments, is based on the word2vec algorithm when executed against the received transaction dataset. In some such embodiments, the contextualizing algorithm treats data of a transaction under the word2vec algorithm as if it were a sentence and a product of the transaction data as a word.

In some embodiments of the method 200, the clustering algorithm performed by the further processing 206 is the k-means algorithm and is performed against the data representations output by the context module.

Figure 3:
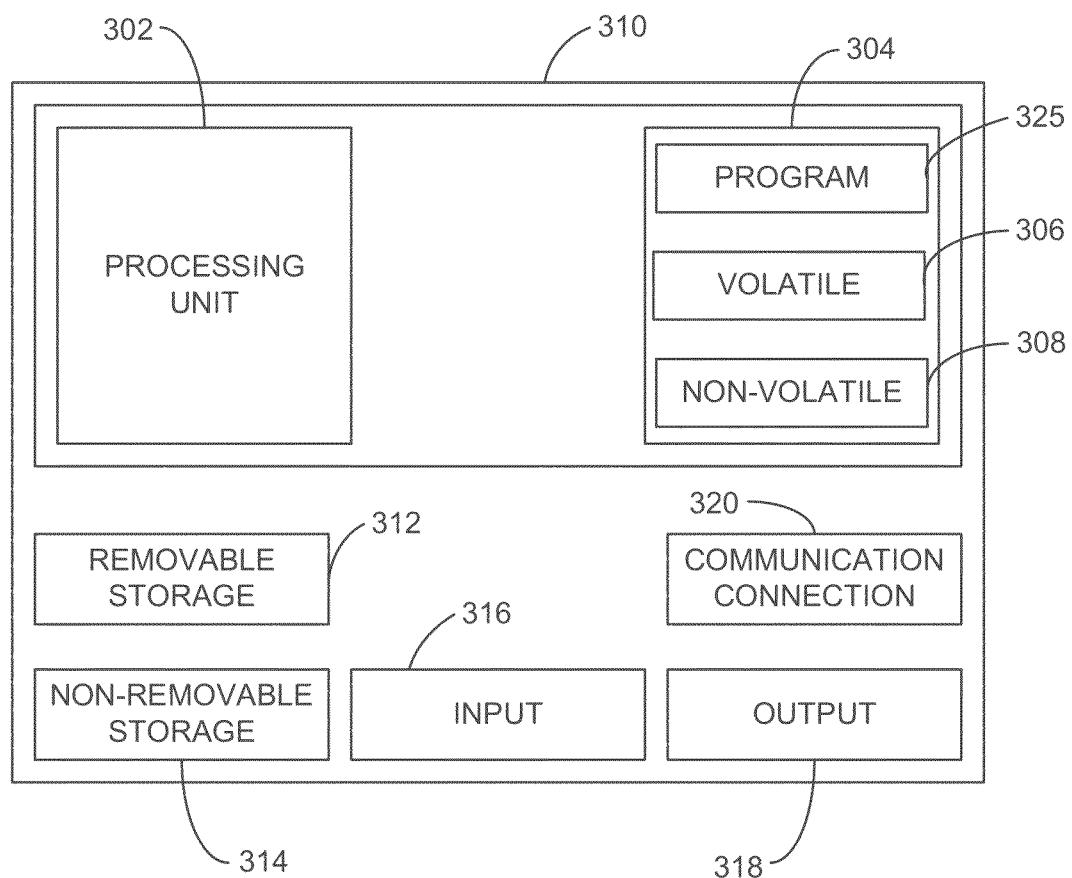
FIG. 3 is a block diagram of a computing device, according to an example embodiment.

FIG. 3 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 310, may include a processing unit 302, memory 304, removable storage 312, and non-removable storage 314. Although the example computing device is illustrated and described as computer 310, the computing device may be in different forms in different embodiments. For example, the computing device may instead be a smartphone, a tablet, smartwatch, or other computing device including the same or similar elements as illustrated and described with regard to FIG. 3. Devices such as smartphones, tablets, and smartwatches are generally collectively referred to as mobile devices. Further, although the various data storage elements are illustrated as part of the computer 310, the storage may also or alternatively include cloud-based storage accessible via a network, such as the Internet.

Returning to the computer 310, memory 304 may include volatile memory 306 and non-volatile memory 308. Computer 310 may include—or have access to a computing environment that includes a variety of computer-readable media, such as volatile memory 306 and non-volatile memory 308, removable storage 312 and non-removable storage 314. Computer storage includes random access memory (RAM), read only memory (ROM, erasable programmable read-only memory (EPROM) and electrically erasable programmable read-only memory (EEPROM), flash memory or other memory technologies, compact disc read-only memory (CD ROM). Digital Versatile Disks (DVD) or other optical disk storage, magnetic cassettes, magnetic tape, magnetic disk storage or other magnetic storage devices, or any other medium capable of storing computer-readable instructions.

Computer 310 may include or have access to a computing environment that includes input 316, output 318, and a communication connection 320. The input 316 may include one or more of a touchscreen, touchpad, mouse, keyboard, camera, one or more device-specific buttons, one or more sensors integrated within or coupled via wired or wireless data connections to the computer 310, and other input devices. The computer 310 may operate in a networked environment using a communication connection 320 to connect to one or more remote computers, such as database servers, web servers, and other computing device. An example remote computer may include a personal computer (PC), server, router, network PC, a peer device or other common network node, or the like. The communication connection 320 may be a network interface device such as one or both of an Ethernet card and a wireless card or circuit that may be connected to a network. The network may include one or more of a Local Area Network (LAN), a Wide Area Network (WAN), the Internet. and other networks. In some embodiments, the communication connection 320 may also or alternatively include a transceiver device, such as a BLUETOOTH® device that enables the computer 310 to wirelessly receive data from and transmit data to other BLUETOOTH® devices.

Computer-readable instructions stored on a computer-readable medium are executable by the processing unit 302 of the computer 310. A hard drive (magnetic disk or solid state), CD-ROM, and RAM are some examples of articles including a non-transitory computer-readable medium. For example, various computer programs 325 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    receiving a transaction dataset including data representative of a plurality of transactions, data representative of each of the plurality of transactions including at least one product purchased within the transaction;
    processing the transaction dataset according to Word2vec algorithm to generate a data representation for each of a plurality of unique products included in the transaction dataset, each generated data representation represents a context of a unique product with regard to each of a plurality of other products included in the generated data representation, the processing including:
        treating the plurality of unique products as words and consumer purchase transactions as sentences;
        mapping, with the data contextualizing algorithm, each unique word of the treated plurality of unique products and consumer purchase transactions to a vector within a vector space of N dimensions, the vector representing the context of the unique product and an associated consumer purchase transaction within the vector space, wherein N is an integer greater than 1; and
        wherein distances between pairs of vectors within the vector space are representative of similarity levels such that a lesser distance represents a greater similarity and a greater distance represents a lesser similarity;
    processing the generated data representations of the plurality of unique products included in the transaction dataset according to a clustering algorithm to partition the plurality of unique products into a number of product clusters, each product cluster containing respective products that are similar to one another; and
    storing and outputting a cluster representation of each the product clusters including data identifying products and a product cluster to which the identified products are partitioned, the cluster representation including at least one of complimentary products and substitute products.

2. The method of claim 1, wherein the data contextualizing algorithm is performed by a context module that executes on a computing device that receives the transaction dataset electronically.

3. The method of claim 2, wherein the clustering algorithm is performed by a clustering module that executes on the computing device.

4. The method of claim 3, wherein the clustering module performs k-means algorithm against the data representations outputted by the context module.

5. The method of claim 1, wherein the number of product clusters output by the clustering algorithm is based on a configuration setting.

6. The method of claim 1, wherein cluster representations of the product clusters are accessed by other processes that identify one or both of interchangeable and complimentary products.

7. A non-transitory computer-readable medium storing computer-executable instructions thereon to implement a method comprising:
    receiving a transaction dataset including data representative of a plurality of transactions, data representative of each of the plurality of transactions including at least one product purchased within the transaction;

processing the transaction dataset according to Word2vec algorithm to generate a data representation for each of a plurality of unique products included in the transaction dataset, each generated data representation represents a context of a unique product with regard to each of a plurality of other products included in the generated data representation, the processing including:

treating the plurality of unique products as words and consumer purchase transactions as sentences;

mapping, with the data contextualizing algorithm, each unique word of the treated plurality of unique products and consumer purchase transactions to a vector within a vector space of N dimensions, the vector representing the context of the unique product and an associated consumer purchase transaction within the vector space, wherein Nis an integer greater than 1; and wherein distances between pairs of vectors within the vector space are representative of similarity levels such that lesser distance represents a greater similarity and a greater distance represents a lesser similarity;

processing the generated data representations of the plurality of unique products included in the transaction dataset according to a clustering algorithm to partition the plurality of unique products into a number of product clusters, each product cluster containing respective products that are similar to one another; and storing and outputting a cluster representation of each of the product clusters including data identifying products and a product cluster to which the identified products are partitioned, the cluster representation including at least one of complimentary products and substitute products.

8. The non-transitory computer readable medium of claim 7, wherein the data contextualizing algorithm is performed by a context module that executes on a computing device that either receives or retrieves the transaction dataset electronically.

9. The non-transitory computer readable medium of claim 8, wherein the clustering algorithm is performed by a clustering module that executes on the computing device.

10. The non-transitory computer readable medium of claim 9, wherein the clustering module performs k-means algorithm against the data representations outputted by the context module.

11. A system comprising:

a processor and a memory device storing instructions executable by the processor to perform a method comprising:

receiving a transaction dataset including data representative of a plurality of transactions, data representative of each of the plurality of transactions including at least one product purchased within the transaction;

processing the transaction dataset according to Word2vec algorithm to generate a data representation for each of at a plurality of unique products included in the transaction dataset, each generated data representation represents a context of a unique product with regard to each of a plurality of other products included in the generated data representation, the processing including:

treating the plurality of unique products as words and consumer purchase transactions as sentences;

mapping, with the data contextualizing algorithm, each unique word of the treated plurality of unique products and consumer purchase transactions to a vector within a vector space of N dimensions, the vector representing the context of the unique product and an associated consumer purchase transaction within the vector spaee, wherein N is an integer greater than 1; and wherein distances between pairs of vectors within the vector space are representative of similarity levels such that a lesser distacne represents a greater similarity and a greater distance represents a lesser similarity;

processing the generated data representations of the plurality of unique products included in the transaction dataset according to a clustering algorithm to partition the plurality of unique products into a number of product clusters, each product duster containing respective products that are similar to one another; and storing and outputting a duster representation of each of the product dusters including data identifying products and a product cluster to which the identified products are partitioned, the duster representation including at least one of complimentary products and substitute products.

12. The method of claim 11, wherein:

the clustering algorithm is executed by a clustering module that executes of the computing device; and the clustering module performs k-means algorithm against the data representations outputted by the context module.

* * * * *